United States Patent [19]
Crestin

[11] Patent Number: 5,478,249
[45] Date of Patent: Dec. 26, 1995

[54] ELECTRICAL CONNECTOR AND MORE SPECIFICALLY A CHARGING CONNECTOR

[75] Inventor: Joseph Crestin, Vanves, France

[73] Assignee: Societe d'Exploitation des Procedes Marechal (SEPM), S.A., Paris, France

[21] Appl. No.: 225,332

[22] Filed: Apr. 8, 1994

[30] Foreign Application Priority Data

Apr. 9, 1993 [FR] France .................. 93 004254

[51] Int. Cl.⁶ .................................................. H01R 13/453
[52] U.S. Cl. ........................ 439/138; 439/137; 439/341
[58] Field of Search ............................ 439/136–141, 439/145, 341, 376

[56] References Cited

U.S. PATENT DOCUMENTS

| | | | |
|---|---|---|---|
| 2,444,843 | 7/1948 | Modrey | 439/140 |
| 2,477,803 | 8/1949 | Huber | 439/145 |
| 3,270,267 | 8/1966 | Nolte, Jr. | 439/34 |
| 3,668,605 | 6/1972 | Albert | 439/341 |
| 5,104,331 | 4/1992 | Goble | 439/341 |
| 5,344,330 | 9/1994 | Hoffman | 439/138 |
| 5,344,331 | 9/1994 | Hoffman | 439/138 |
| 5,385,480 | 1/1995 | Hoffman | 439/138 |
| 5,413,493 | 3/1995 | Hoffman | 439/188 |

FOREIGN PATENT DOCUMENTS

| | | |
|---|---|---|
| 933196 | 9/1946 | France . |
| 93/04511 | 3/1993 | WIPO . |

*Primary Examiner*—Neil Abrams
*Attorney, Agent, or Firm*—Sandler, Greenblum & Bernstein

[57] ABSTRACT

Electrical connection device comprising two connection elements of which one is mobile, and which are arranged to be capable of mutually coupling and uncoupling by rotation of the mobile element in the other element and to connect or reciprocally separate the opposing contacts with which they are provided. The mobile element is a coupler socket and the other element a connector outlet. The outlet is provided with a protective element which covers the contacts of the outlet when at rest, and which is rotationally mounted therein so as to be capable of being rotationally driven by the coupler socket during coupling. The protective element comprises two flaps which can slide with respect to one another and which are each provided with at least as many openings as there are contacts in the outlet and which are arranged in the same manner. The flaps are positioned with respect to one another when at rest, so that the openings are mutually offset, and means being provided to drive the sliding of the flaps with respect to one another during coupling.

27 Claims, 7 Drawing Sheets

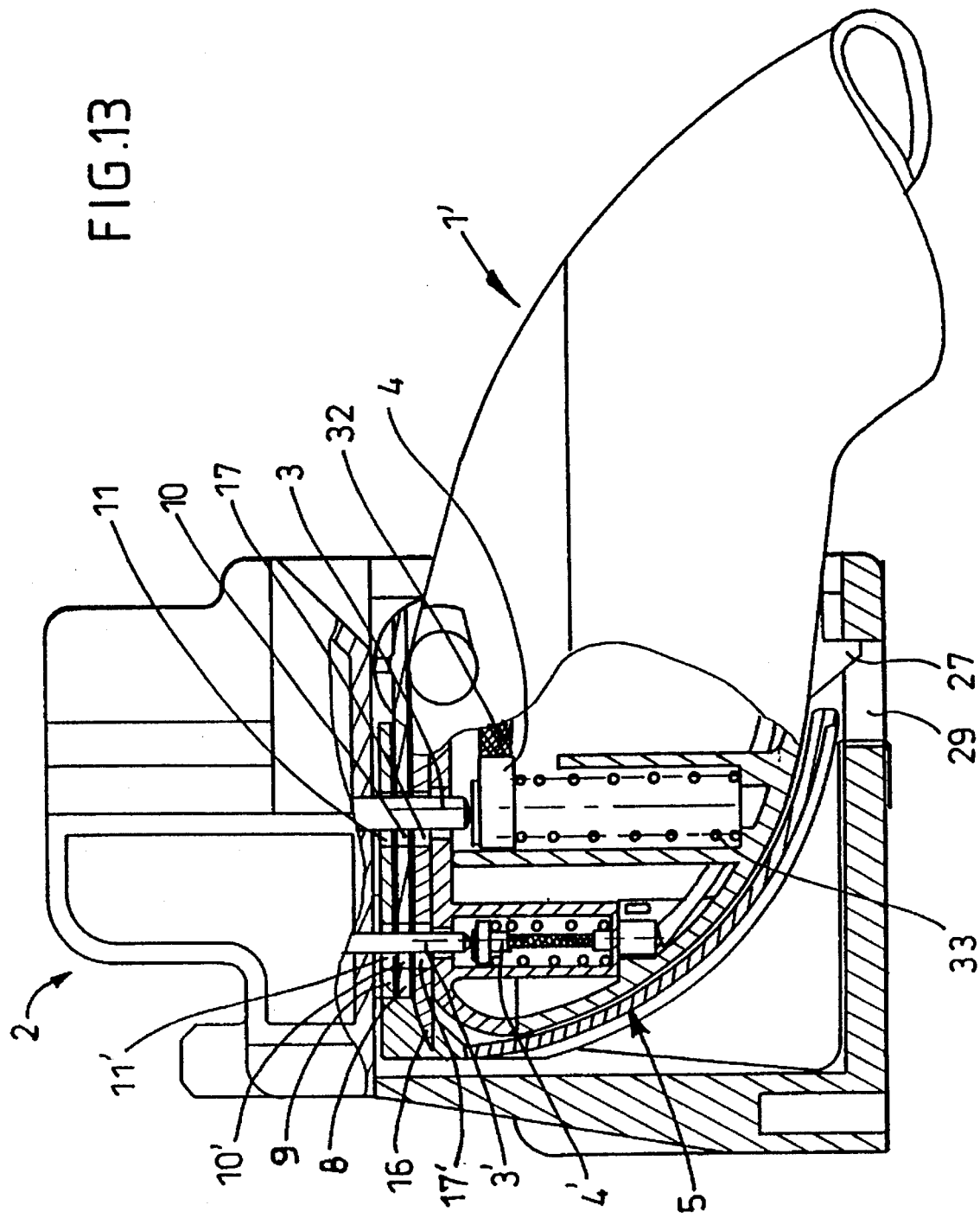

ELECTRICAL CONNECTOR AND MORE SPECIFICALLY A CHARGING CONNECTOR

BACKGROUND OF THE INVENTION

1. Field of the Invention

The present invention relates to an electrical connector, and more specifically, a charging connector.

2. Discussion of Background Information

A connector includes a coupler socket connected to a flexible cable and a connector outlet integral to a utilization apparatus. The coupler socket is connected by its cable to a power supply source. In order to be a charging connector, the outlet should be connected to or form part of the apparatus to be charged. The apparatus to be charged can, for example, be an accumulator battery for vehicles or other electric systems. Moreover, the expression charging connector must be understood as a connector, such as previously defined, except that the outlet connected to accumulators can also be current-carrying.

The known connectors are often impractical to use and require difficult coupling maneuvers with translational and/or coaxial rotational movements of the socket in the outlet. In addition, it is often necessary to exert substantial forces, which complicate the maneuvers.

These difficulties are major disadvantages for the above mentioned charging application of an electrical vehicle, since it must be capable of being accomplished by the user himself. In addition, if one can provide slow charging connectors in order to ensure charging at the user's residence, for example, one must also envision connectors capable of supporting a quick charging, undertaken, for example, at a special supply station.

Generally, a charging connector is provided with pilot contacts intended to control a disconnection apparatus located upstream from the connector outlet and/or the coupler socket so as to control an interrupter. Indeed, in addition to any problem in protecting the contacts, it is advantageous that the connection and separation of the power contacts be undertaken when idle. For that, it suffices that the pilot contacts act upon the interrupter such that the latter closes the circuit after the connection of the power contacts, and inversely, opens the circuit after the separation of the contacts. Such a measure is not simple to obtain.

When seeking to improve an aspect of a connector, the solution adopted often presents disadvantages for the other aspects to be treated. This is why the inventor has sought a device which is entirely practical and safe.

Certain connection devices are also known, which comprise two connection elements of which one is mobile, and which are arranged to enable mutual coupling and uncoupling and connect, or reciprocally separate, the opposing contacts with which they are provided. The contacts of at least the non-mobile element having contact pieces that extend parallel to one another and define a connection direction, whereas the coupling and uncoupling are undertaken by rotation of the mobile element in the other element about an axis arranged geometrically in a manner perpendicular to the connection direction.

This is for example, at least partially, the case of the device described in U.S. Pat. No. 3,668,605. However, these devices are neither provided nor arranged to include a connector such as defined hereinabove, and even less a charging connector.

SUMMARY OF THE PRESENT INVENTION

It is an object of the present invention to provide a connector comprising two connection elements, such as defined hereinabove, the mobile element being a coupler socket and the other element a connector outlet.

In addition, especially in order for the present invention to comprise a charging connector, but not exclusively, the invention provides that the mobile element is a coupler socket and the other element a connector outlet. The outlet is provided with a protective element that, at rest, covers the contact pieces of the outlet and which is rotationally mounted therein so as to be capable of being rotationally driven by the coupler socket during coupling.

The protective element comprises two flaps which can slide with respect to one another, and which are each provided with at least as many openings as there are contact pieces in the outlet and which are arranged in the same manner. The flaps are positioned at rest with respect to one another so that the openings are mutually offset and means are provided to drive the sliding of the flaps with respect to one another during coupling, until causing the juxtapositioning of the openings which can then be crossed by the contact pieces of the outlet.

Aside from any particular protection problem of the exposed contacts, the protection element must at least include a psychological element for the user or even a protector against inclement weather.

Advantageously, the protective element comprises at least one latching means, which in an initial position prevents any rotation, the means being unlatchable by the coupler socket during its coupling. The means that drive the sliding of the outlet flaps with respect to one another are arranged so that the sliding is undertaken, at least, during rotation of the coupler socket.

Preferably, the means that drive and/or maintain the sliding of the outlet flaps with respect to one another comprise at least one fixed cam arranged in the outlet and at least one driving finger that is fixed to one of the flaps and which is intended to cooperate with the cam.

According to an embodiment of the invention comprising, as already mentioned, a latching means, in the initial position of the protective element, is ensured by the driving finger which comes into abutment on a portion of the fixed cam and which is brought to the unlatching position by the socket during its coupling, which simultaneously ensures the sliding of the flaps with respect to one another. The sliding is continued and/or maintained by the cooperation of the finger and the cam. It is clear however, that the latching means in the initial position could be independent of the means ensuring the sliding of the flaps on one another.

According to the present invention, the coupler socket is also provided with a curved frontal shape, lateral lugs, and a hooking and latching means in the socket. Similarly, the protection element can comprise an incurved base, at least one guiding lug, and return springs. All these means are described in further detail hereinafter.

According to an embodiment of the present invention, the socket is provided with contacts arranged in shafts, whose mouths, when at rest, are masked by a translationally mounted protective flap and provided with at least as many openings as the socket is provided with contacts, and which are arranged in the same manner. The outlet is provided with appropriate means to enable the sliding of the socket flap so as to juxtapose the openings of the flap with the contacts of the socket during coupling. Accordingly, the socket as well as the outlet are protected.

Preferably, outlet means for making the socket flaps slide comprise at least one fixed abutment arranged so as to bias the rear portion of the flap by pushing it frontwardly during rotation of the socket. Corresponding openings are provided in the flaps of the protective element for the passage of the abutment. The socket flap is latched when at rest by at least one elastic means that is retractable by biasing of at least one appropriate means during coupling. The latter means comprises, for example, the guiding lug provided to position the socket.

A connector, and more specifically a charging connector, according to the present invention, whose outlet and socket are each provided with at least one pilot contact that is intended to control a disconnection apparatus arranged upstream from one of the elements, can additionally be characterized in that each pilot contact is arranged on the corresponding element at a greater distance from the geometric axis of rotation of the socket than the power contacts of the element. This arrangement allows, during coupling of the elements by rotation, the connection of the pilot contact of one element with the opposing pilot contact of the other element only after the connection of the power contacts, and inversely, during uncoupling of the elements, the disconnection of the pilot contacts before the disconnection of the power contacts.

This arrangement is totally advantageous since a correct connection order between the pilot contacts and the power contacts is necessarily obtained. In the case of a charging connector for automotive vehicles, the outlet is provided to be arranged on the vehicle and the coupler socket to be connected to an electrical power supply.

The contacts can be of various types, but according to an embodiment of the present invention, the contacts of at least one of the elements are pressure contacts. Advantageously, at least some of the contacts of at least one of the elements comprise elastically mobile contact terminals fixed to connection cables arranged at the level of the terminals, perpendicular to the direction of connection.

The present invention concerns a connector in general, and more specifically a charging connector. Further, the invention also concerns the outlet and coupler socket of the connector, each taken separately.

BRIEF DESCRIPTION OF THE DRAWINGS

The invention will be better understood and other characteristics will become apparent upon reading the following description with reference to the annexed drawings wherein:

FIG. 13 is a longitudinal sectional view of the connector outlet and a portion of a coupler socket in connection position, according to the present invention.

DETAILED DESCRIPTION OF THE PREFERRED EMBODIMENTS

Figure 1:
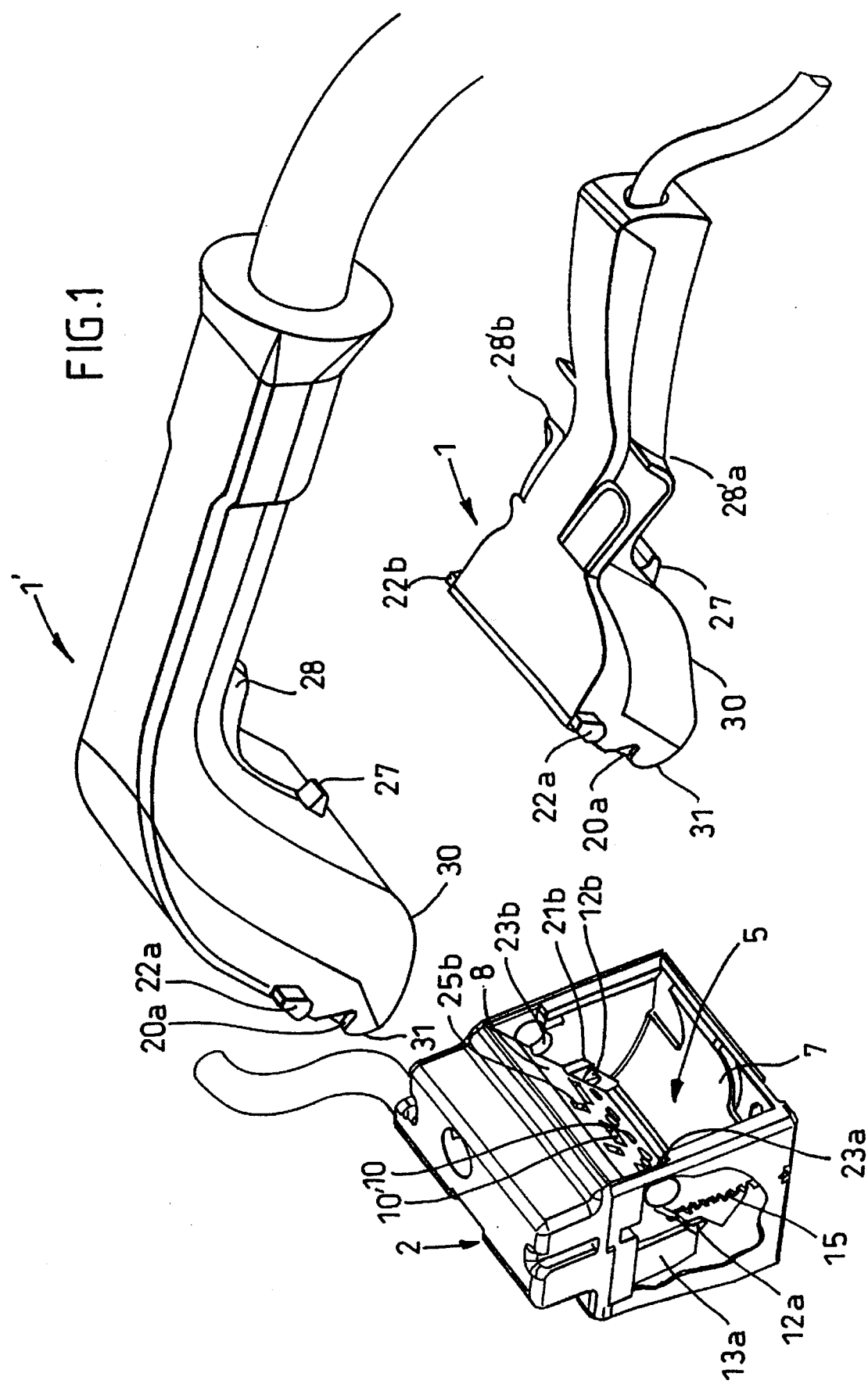
FIG. 1 is a perspective view of a connector outlet according to the invention and two embodiments of a coupler socket.

A connector according to the present invention comprises a coupler socket, of which two embodiments 1, 1' are represented in the drawings, and an outlet 2. For a charging connector of an electrical vehicle, the outlet 2 is intended to be arranged in the vehicle and connected to the accumulator batteries, whereas the coupler sockets 1, 1' are provided to be connected to an electrical power supply.

In FIG. 1, both sockets 1 and 1' are represented, whereas FIGS. 5 to 12 shows the socket 1 and FIG. 13 shows the socket 1'. The differences between the sockets 1 and 1' are mainly due to their functions. Therefore, sockets 1 and 1' have different sizes. Socket 1, for example, is used for a slow charging whereas socket 1' can ensure a quick charging by means, for example, of an electric supply terminal provided for this purpose. However, sockets 1 and 1' both have a crosshead shape to facilitate their handling.

The contacts of outlet 2 are in the form of mutually parallel pins such as 3, 3', as shown in FIGS. 5 to 13 Parallel pin 3, for example, is a power or phase contact, and 3' is a pilot contact, which will be discussed hereinafter. There are, of course, as many contacts as desired.

The coupler socket comprises opposing contacts such as 4 and 4', shown in FIG. 13, which are intended to connect with the previously mentioned outlet contacts. Contact 4, for example, is a power contact and 4' a pilot contact.

The Figures clearly show that the outlet contacts 3, 3' project from the upper face 40 of outlet 2, whereas the contacts 4, 4' of coupler socket 1, 1' are provided inside the shafts 41, 41' including upper openings 41a and 41a', as shown in FIG. 13, and therefore do not project outwardly.

Figure 2:
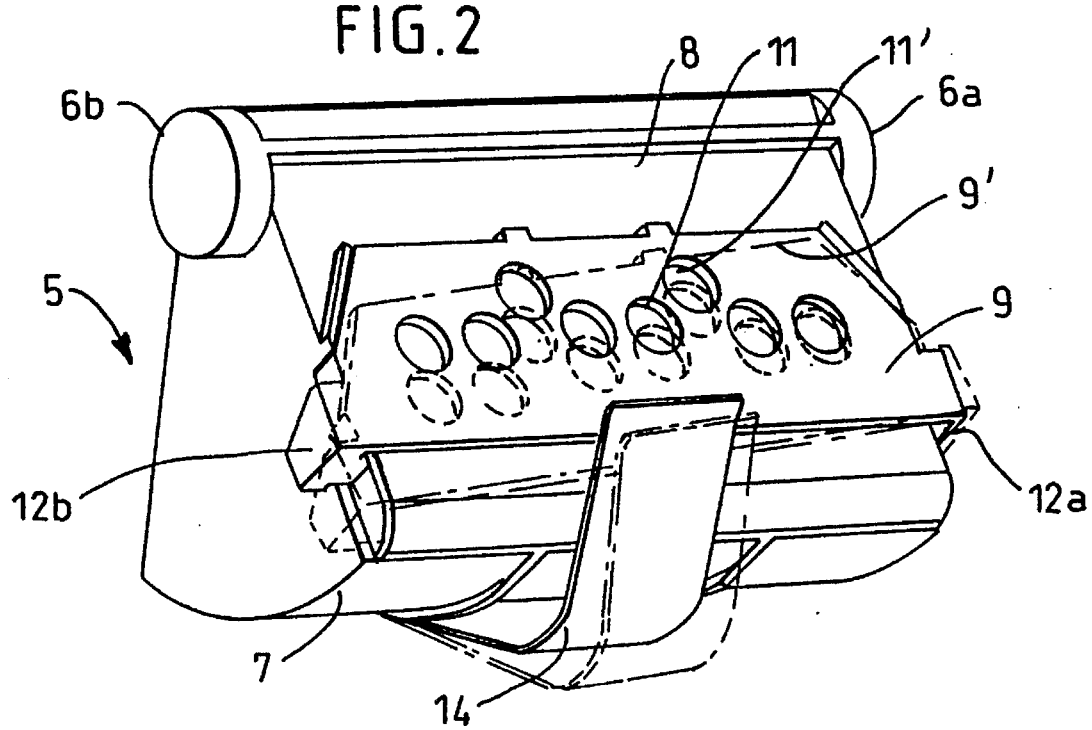
FIG. 2 is a rear perspective view of a protective element according to the invention.

In outlet 2, a protective element 5 is mounted, which is more specifically visible in FIGS. 1 and 2. Element 5 is rotationally mounted in outlet 2 by means of lugs 6a, 6b, as shown in FIG. 2, intended to be housed in appropriate bearings of outlet 2.

Protective element 5 forms a kind of wedge open towards the outside of the socket and is equipped with an incurved base 7 affixed to or integral, e.g., of one piece construction, with a base flap 8 on which an upper flap 9, as shown in FIG. 2, is slidably mounted. As is clearly shown in FIG. 2, rotation lugs 6a and 6b are arranged in the vicinity of the free edge of base flap 8. In addition, protective element 5 comprises lateral walls 42, only one of which is shown in FIG. 2, connecting base flap 8 and base 7.

Flaps 8 and 9, as shown in the drawings, and more specifically in FIGS. 1, 2 and 11 to 13, are provided with openings such as 10 and 10', as shown in FIG. 1 and FIGS. 11 to 13, for flap 8 and 11, 11' for flap 9, as shown schematically in FIG. 2 and FIGS. 11 to 13.

The upper flap 9 additionally comprises two lateral fingers 12a, 12b intended to cooperate with cams, such as cam 13a of the outlet connector, as will be explained hereinafter. Only lug 12b and cam 13b are visible in FIGS. 5 to 13, the lug also being sectionally represented in the drawings for reasons of clarity.

Flap 9 can slide on flap 8, and it is biased, when at rest, towards the side of the opening of outlet 2 by a spring 14, more specifically visible in FIG. 2. Openings 10, 10' of flap 8 and openings 11, 11' of flap 9 are arranged in the same manner as contacts 3, 3' of the outlet. In addition, they are initially positioned so that they are not juxtaposed, as shown in FIG. 1.

The protective element 5 is arranged in outlet 2, as already indicated, by its lugs 6a, 6b but such that, when at rest, flaps 8 and 9 form a dihedral angle with the upper wall of outlet 2 from where the contacts 3, 3' project. This initial position is thus elastically returned by springs, such as spring 15 visible in FIGS. 1 and 12. Another spring is generally provided in a symmetrical manner on the other side. Thus, contacts 3, 3' of the outlet are masked and protected when at rest.

Furthermore, fingers 12a and 12b of the flap are in abutment in this initial position with a corresponding portion of the cams, such as cam 13b, as is clearly shown in FIGS. 1 and 5 to 7, which rotationally latches protective element 5.

Socket 1, 1' comprises a flap 16 on its upper portion, as shown in FIGS. 3 and 10 to 13, which is provided with openings such as 17, 17' arranged in the same manner as contacts 4, 4' with which the socket is equipped.

Figure 3:
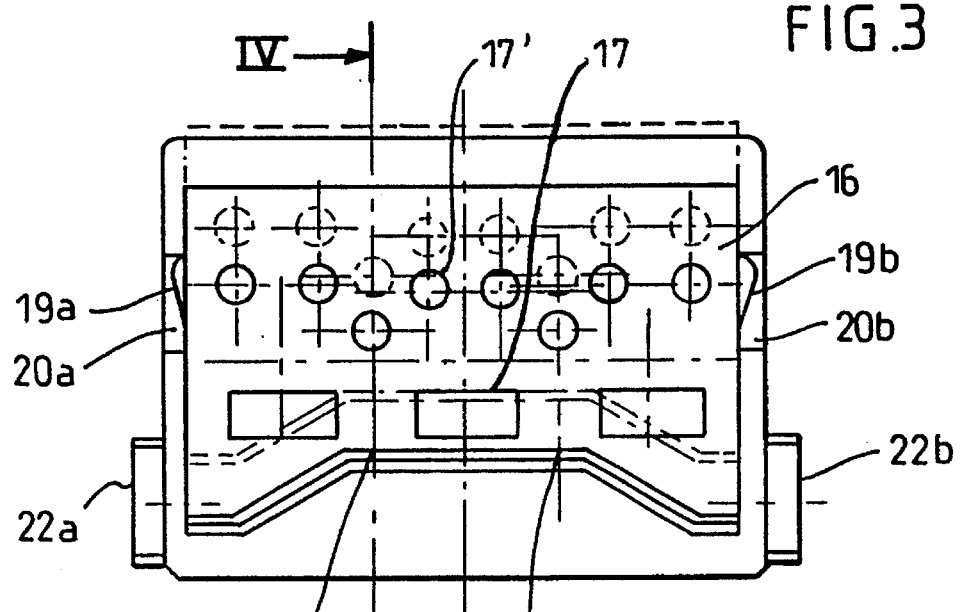
FIG. 3 is a top planar view of the coupler socket according to the present invention.
Figure 4:
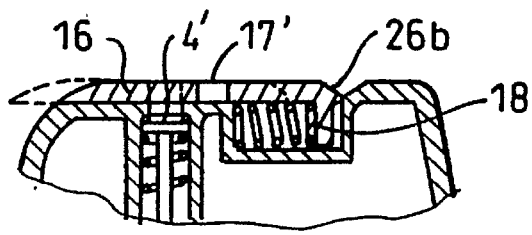
FIG. 4 is a partial sectional view taken along line IV—IV of FIG. 3.

Flap 16 is slidably mounted on the top of the socket so as to be able to slide frontwardly. Flap 16 is initially positioned so as to mask all contacts 4, 4' of the socket. It is biased in this position by at least one spring 18, as shown in FIG. 4, and preferably two, and schematically shown in FIG. 11. Flap 16 is additionally latched by elastic fastening hooks 19a, 19b which, when at rest, are positioned in notches 20a, 20b, as shown in FIG. 1, 3 and 5 to 9, arranged in the socket and which will be discussed hereinafter.

Furthermore, outlet 2 is equipped with guiding lugs such as lug 21b visible in FIGS. 1 and 5 to 9. Another finger is of course symmetrically provided on the other side. The guiding lugs are arranged in front of fingers 12a and 12b of upper flap 9 of protective element 5. In addition, as shown in FIGS. 1 and 3, the socket is provided with lateral lugs 22a, 22b intended to come into housings 23a, 23b which are arranged near the rotational axis of the protective element 5, as shown in FIG. 1, of the protective element, as will be explained hereinafter.

Figure 8:
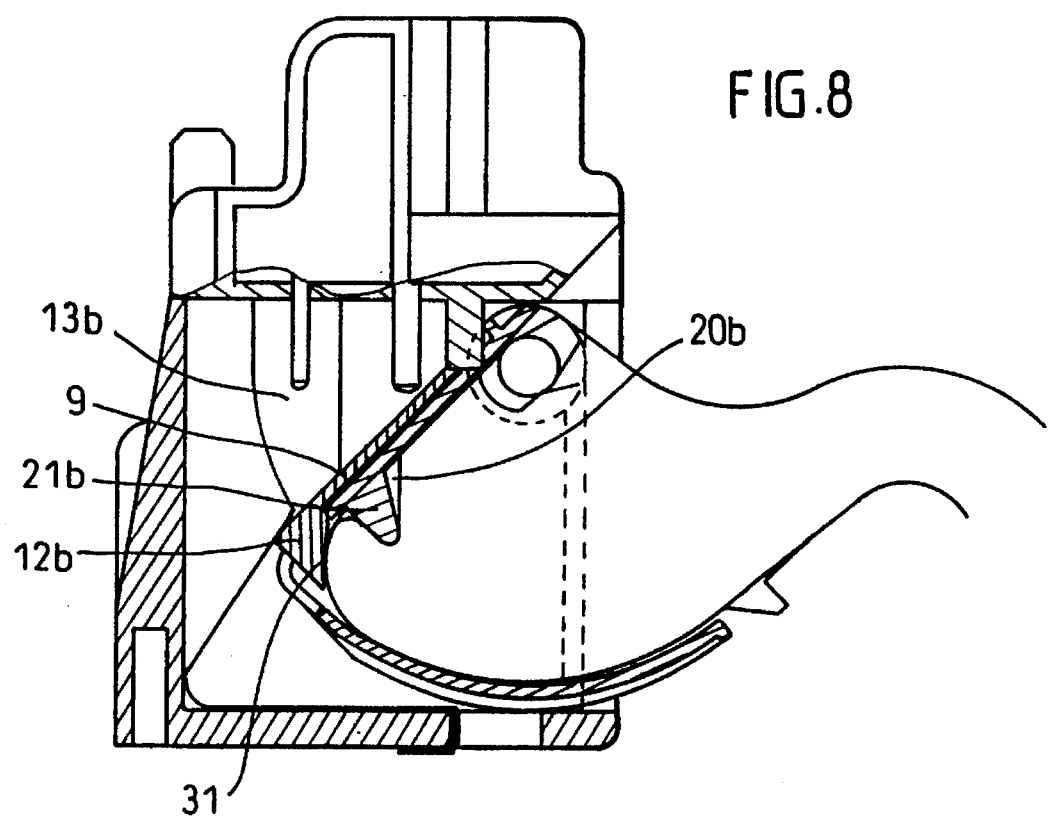
Figure 9:
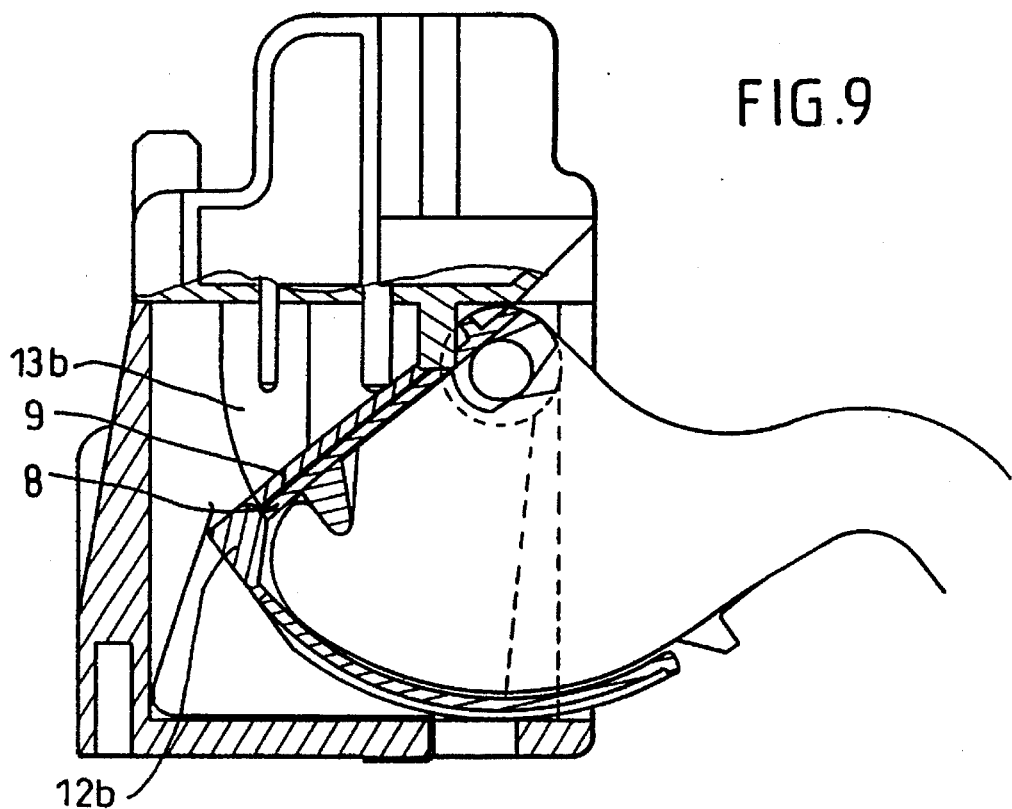
Figure 10:
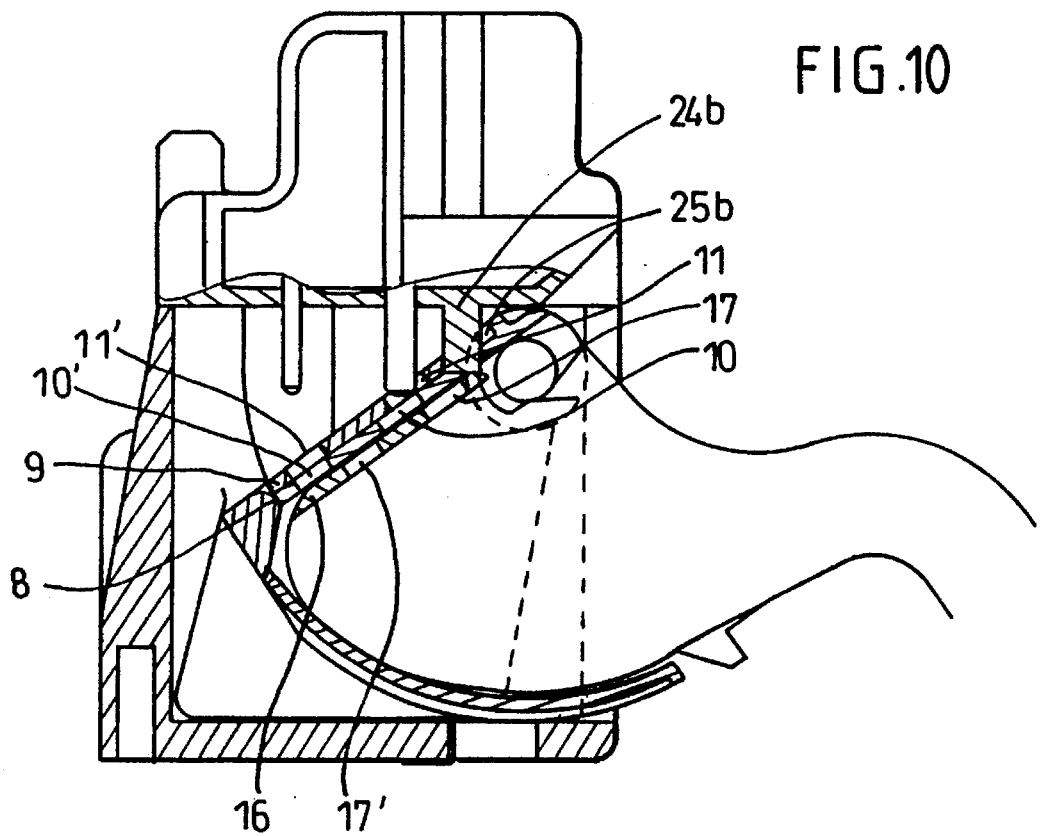

Outlet 2 is equipped with two abutments of which only one, 24b, is visible in FIGS. 5 to 12, which will be able to cross the corresponding openings of flaps 8 and 9, such as opening 25b of flap 8 of FIGS. 1 and 10. The abutments, such as abutment 24b, are provided to push the corresponding zones 26a, 26b, as shown in FIGS. 3 and 4, of flap 16 of the socket.

It can also be seen in the drawings that socket 1, 1' is provided with a hook 27 which is activated by a lever 28 for socket 1 of FIGS. 1 and 13, or by lateral pushers/thrusters 28'a, 28'b, for socket 1'. Hook 27 is intended to cooperate with a window 29 of the outlet, provided across from the axis of rotation of protective element 5. Finally, it can also be noted that socket 1, 1', has an incurved shape 30 intended to assume the corresponding shape of base 7, and the frontal end 31 of the socket is curved by forming a sort of cam which will be discussed hereinafter.

The operation of the present invention will be better understood upon reading the following description of the coupling maneuvers broken down according to FIGS. 5 to 13.

FIGS. 5 to 13 are schematic and only show more specifically the characteristic elements which explain the position of the elements. For each of the representations, except FIG. 5, the number of reference numerals have been limited to keep only the necessary reference numerals for explaining operation of the elements.

Figure 5:
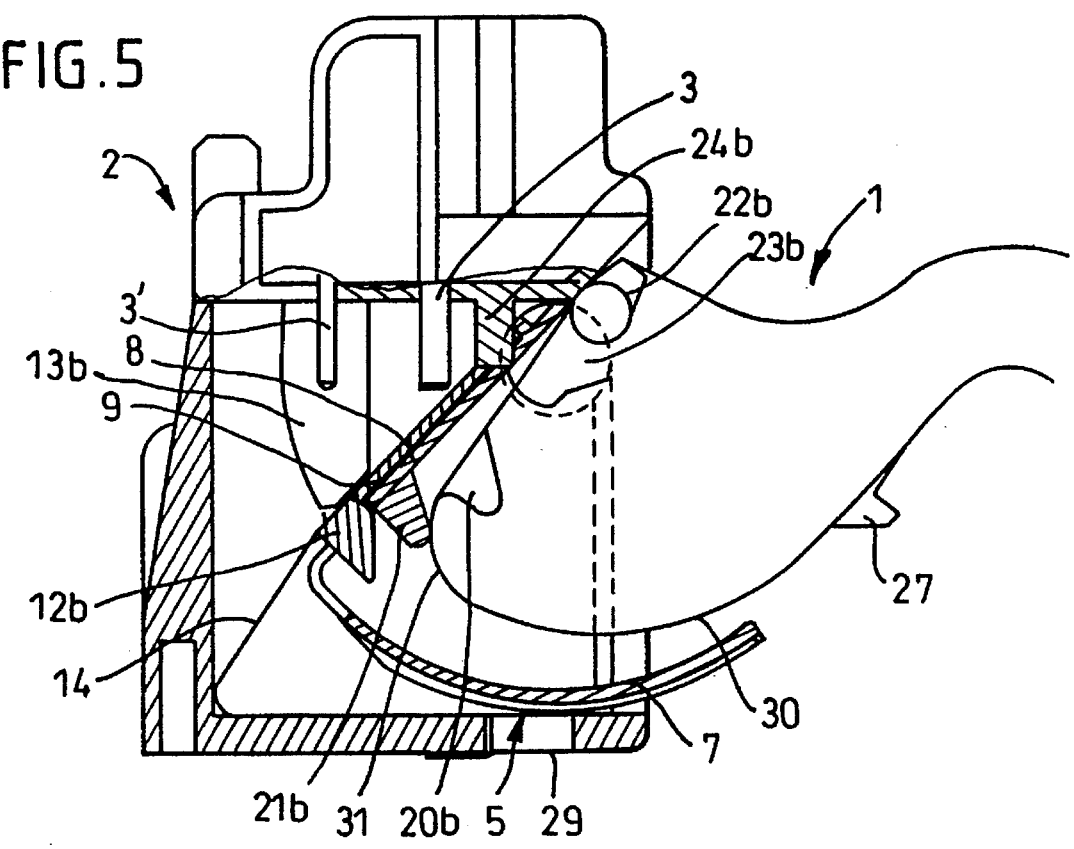
FIGS. 5 to 12 are schematic sectional views of the various coupling phases of a coupler socket in the connector outlet, thus showing the operation of the various elements.

FIG. 5 shows the approach of socket 1 in the protective element 5 of outlet 2, the element being rotationally blocked by finger 12b of flap 9 which is pressed on an appropriate zone of cam 13b.

Figure 6:
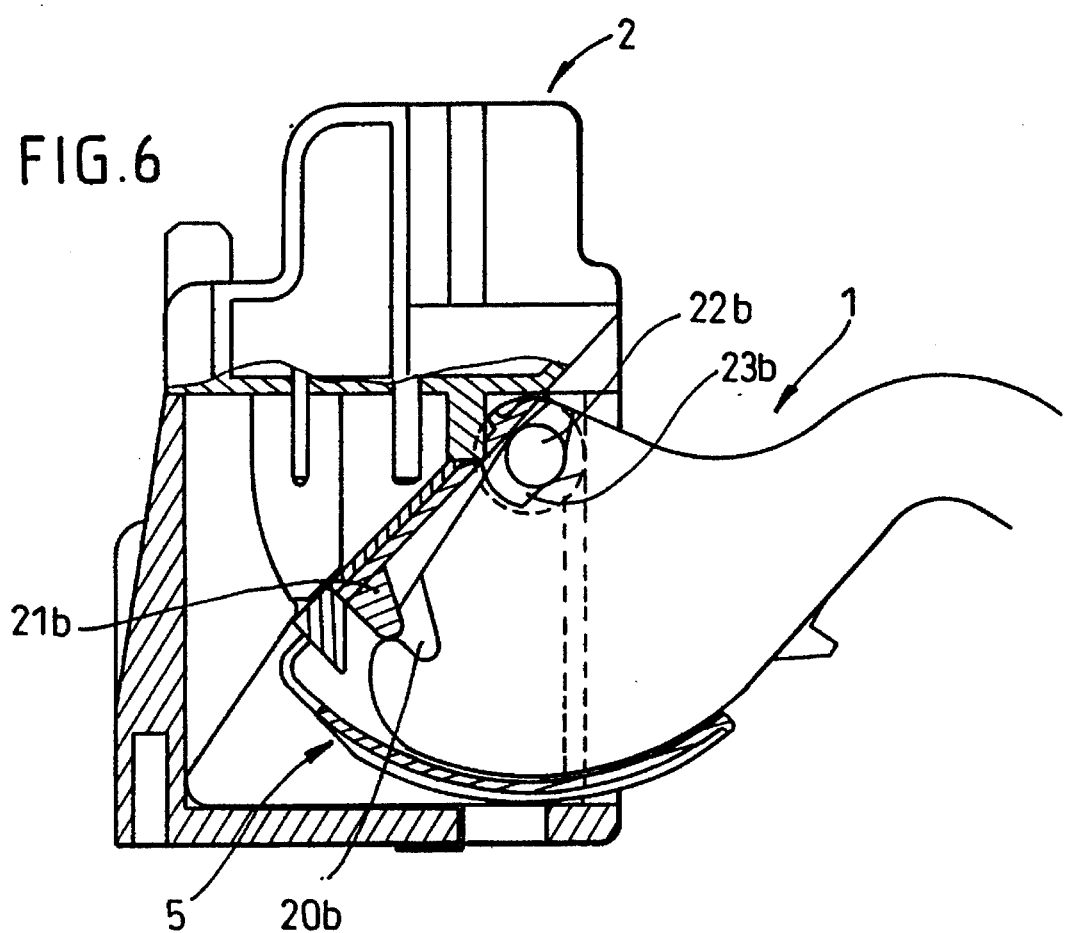

FIG. 6 illustrates a positioning of socket 1 by its lugs, such as 22b in the corresponding housings, such as 23b. This phase is important, and FIG. 6 additionally shows that the shape of housing 20b in which guiding lug 21b of the protective element must come, as well as the shape of housing 23b, are such that if the socket is not presented precisely in this position, a complementary rotation of the socket will cause the socket to escape protective element 5. On the contrary, if the socket is properly positioned from the beginning of the rotation of the socket, it can no longer escape element 5.

Figure 7:
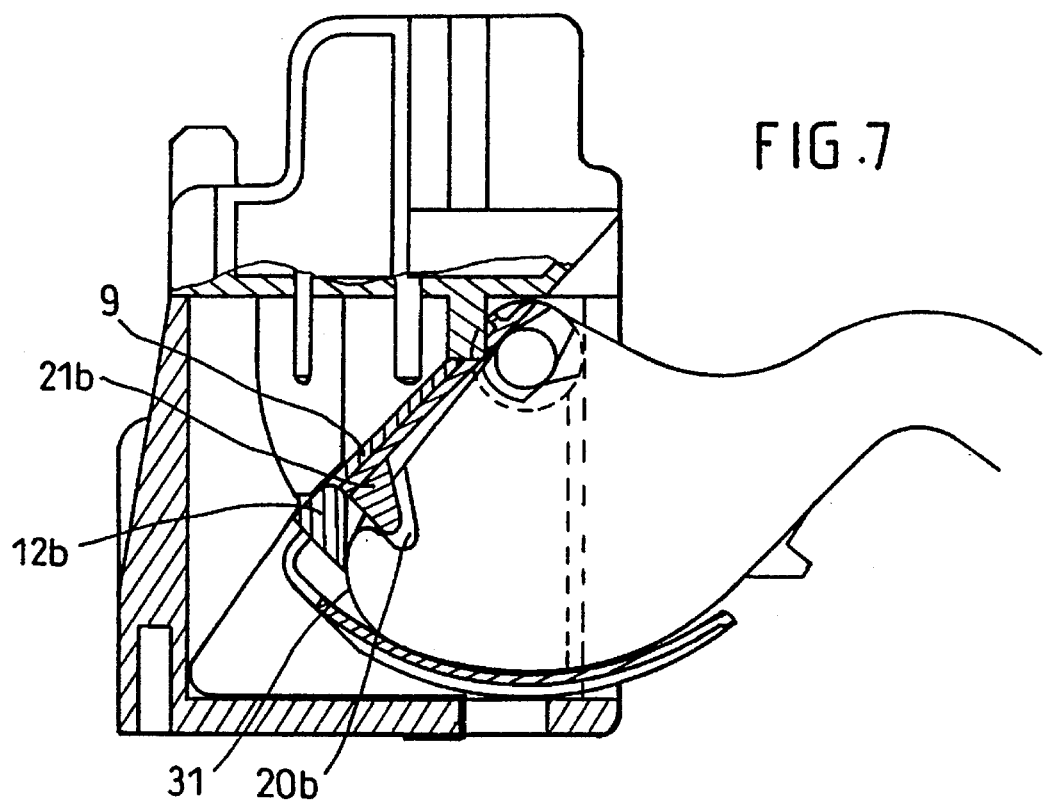

Indeed, it is very important to note that from this positioning, all the members are controlled by a rotation of socket 1 in outlet 2. From the beginning of the rotation of the socket, as shown in FIG. 7, lug 21b, by positioning itself in housing 20b, correctly positions the elements one inside of the other. In addition, in FIG. 7, one can see the curved frontal end 31 of the socket come in contact with finger 12b of flap 9.

In FIG. 8, while the rotation of the socket proceeds, the end 31 translationally drives finger 12b of flap 9, and the finger leaves the latching zone 43 of cam 13b, which is an inclined planar zone in the drawings. Element 5 is then rotationally unlatched, as flap 16 of the socket, more clearly visible in FIG. 3, is similarly translationally unlatched by virtue of guiding lug 21b, which, by housing itself completely in housing 20b, causes the retracting or set-back of elastic latching hook 19b, as shown in FIG. 3. The same thing of course happens on the other side for hook 19a. If the translation of finger 12b enables element 5 to be unlatched, this translation also concerns that of flap 9 on flap 8.

FIG. 9 shows the beginning of the rotation of the socket and element 5 assembly. The shape of cam 13b enables the finger 12b to complete the translation of flap 9 on base flap 8, (the substantially horizontal zone of the cam is visible in the preceding figures and possibly at the beginning of the curved portion of the cam), such that the contacts of the outlet are capable of crossing the flaps, as will be explained hereinafter. It is clearly seen that from this position, the coupler socket is no longer in contact with finger 12b, and the relative position of flaps 8 and 9 are maintained during the rotation which follows by virtue of the appropriate curved shape of the cam. However, with the suitable shapes of the socket and finger 12b associated with an appropriate configuration, one can envision a complete translation of flap 9 by the socket only, the cam being reduced to a rotational latching abutment, which could further be replaced by another means.

FIG. 10 shows the continuation of the rotation operations. In this Figure, flaps 8 and 9 are shown equipped with their openings 10, 10'; 11, 11', and additionally shown is flap 16 of the socket also equipped with its openings 17, 17'. The previously mentioned openings and flap 16 are not visible in the preceding FIGS. 5 to 9, whereas they are visible in the FIG. 10 and the following FIGS. 11 to 13.

Figure 11:
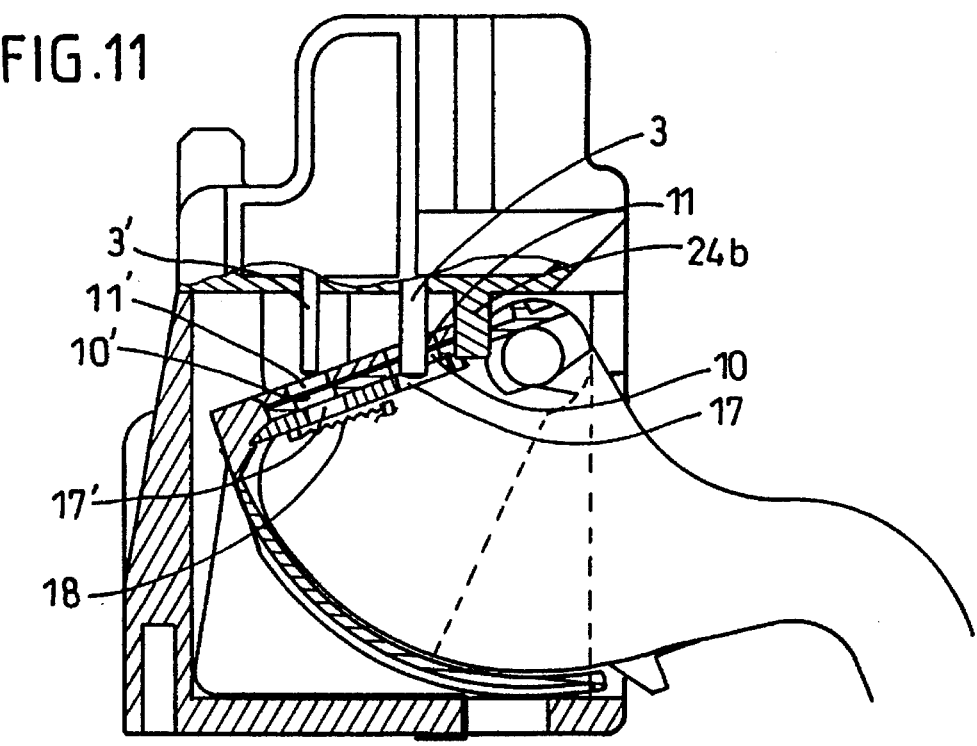

As shown in FIG. 10, abutment 24b, crosses the appropriate openings 25b, as already mentioned, and flaps 8 and 9, are pressed to the rear of flap 16 of the socket on an appropriate portion 26b, as previously described regarding FIG. 2. As shown in FIG. 11, sliding of flap 16 is driven frontwardly by abutment 24b until its openings 17, 17' are practically facing the openings 10, 10'; 11, 11' of flaps 8 and 9 for the passage of outlet contacts 3, 3', as can be seen in FIGS. 11 to 13.

Figure 12:
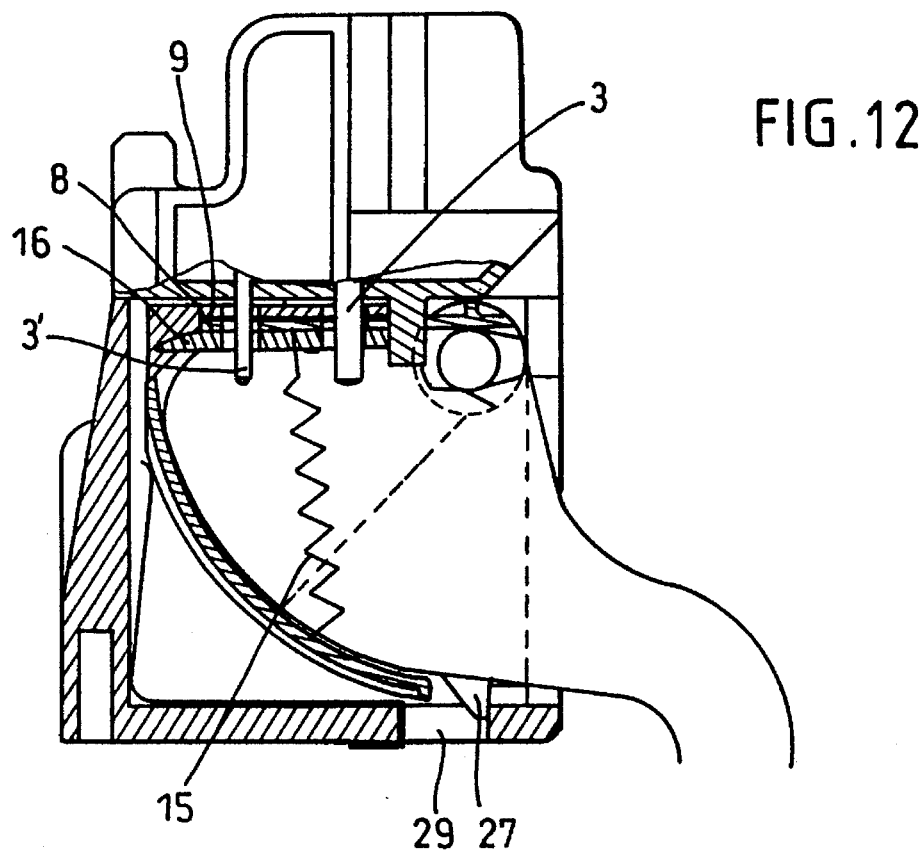

In FIGS. 12 and 13, which represent the final coupling position, one can clearly see the outlet contacts 3 and 3' completely cross flaps 8, 9 and 16. One can also see hook 27 of socket 1 in window 29 of the outlet, such that the socket is immobilized in the outlet. In addition, FIG. 13, which will be discussed hereinafter, shows the electrical connection between contacts 3, 3' of the outlet and contacts 4, 4' of the socket.

In FIG. 13, an end pressure contact 4' is shown with spring 44 and braid 45 and another more special contact 4. Specifically, contact 4 is a contact terminal affixed to the exposed end of a cable 32 and which is biased by a spring 33. The mobility of contact 4 is made possible by virtue of the bottoming of the cable 32 whose end is substantially perpendicular, in connecting position, with the opposing contact 3 of the outlet.

If the example includes a power contact 4 of this nature, it could inversely pertain to pilot contacts 4' or all of the contacts, thus eliminating the disadvantages one can encounter in braid contacts.

The only maneuvering movement for the coupling of the socket in the described embodiment is, advantageously, a simple rotational movement. However, this rotational movement could be preceded by a first translational movement to unlatch the elements and/or drive the translation of the socket flap, for example. The inventor has sought a more novel embodiment which simplifies the manipulations.

The rotational movement is additionally advantageous given the considerable force which can be deployed, from where a satisfactory contact pressure is easily obtained. In addition, given an arc of a circle connection, one ensures a friction at the end of the path, and therefore, a self-cleaning of the contact ends.

With the position of the contacts as shown, it is clear that the connection of power contacts 3 and 4 is established before that of pilot contacts 3', 4'. In order to uncouple the elements, it suffices to undertake inverse maneuvers after having unlatched the socket by acting on lever 28 or one of pushers/thrusters 28a, 28b, as shown in FIG. 1. During this uncoupling operation, one again obtains a friction of the contacts and an inverse disconnection order, i.e., disconnection of the pilot contacts first, and the power contacts next.

Thus, if one necessarily respects the desired connection and disconnection order of the various contacts, the connection and disconnection sequences are additionally capable of being adjusted by a complementary shifting of the contacts whose ends are not necessarily all in the same plane.

To return to the initial position, it is understood that flap 16 of the socket is biased by springs, such as spring 18 of FIGS. 4 and 11, that element 5 is rotationally biased by springs such as 15, as shown in FIGS. 1 and 12. Finally, flap 9 slides in inverse direction on flap 8 to again latch element 5 by virtue of spring 14, visible in almost all of the drawings, but more specifically in FIG. 2.

If, as shown more specifically in FIG. 1, guiding lug 21b partially hampers the access of finger 12b while protecting it, FIG. 2 shows that a unilateral bias of a lug 12a or 12b, with something other than coupler socket 1, 1', causes a slanting of flap 9, as shown by the dotted lines in 9' in FIG. 2, thus causing an incomplete unlatching. This is due to the fact that there is only one single spring 14 whereas one generally provides two springs 15 and two springs 18.

Of course, numerous variations can be envisioned without departing from The scope of the invention. This is how the mobile contacts equipped with springs could be provided in the outlet rather than in the coupler socket, for example.

Lateral lugs 22a, 22b of the socket only serve as support and are not indispensable, the coupler socket being capable of being guided essentially by the shape of element 5.

In addition, as already mentioned, the rotational latching means of element 5 and the slidably driving means of flap 9 can be separate, and coupler socket 1, 1' could cause a rotational unlatching by activation of a latch or similar, for example, whereas the sliding of the flaps would only be caused by the fixed cams. On the contrary, according to another embodiment, the fixed cams could be reduced to the portion forming the latching abutment whereas the translational sliding could, as already mentioned, be entirely ensured by the coupler socket. In this latter case, it is again possible to completely suppress the cams, the rotational latching being otherwise undertaken, whereas the socket always ensures the unlatching and sliding of the flaps, which are further maintained in this position by any appropriate means.

While the invention has been described with reference to several exemplary embodiments, it is understood that the words which have been used herein are words of description and illustration, rather than words of limitation. Changes may be made, without departing from the scope and spirit of the invention in its aspects. The invention extends to all functionally equivalent structures, methods and uses, such as are within the scope of the appended claims.

This application is related to French Patent Application 9304254, filed Apr. 9, 1993, to which priority is claimed, and the entire disclosure of which is hereby incorporated by reference.

What is claimed is:

1. An electrical connector comprising:

a non-mobile connection element comprising a connector outlet including a plurality of first contacts;

a mobile connection element comprising a coupler socket including a plurality of second contacts capable of opposing said plurality of first contacts;

at least said first contacts comprise contact pieces extending parallel to one another and defining a connection direction, said non-mobile connection element and said mobile connection element are arranged to be capable of mutually coupling and uncoupling, and connecting or reciprocally separating said plurality of first contacts and said plurality of second contacts by rotation of said mobile connection element in said non-mobile connection element about an axis perpendicular to said connection direction; and a protective element rotationally mounted in said connector outlet so as to be capable of being rotationally driven by said mobile connection element during coupling, said protective element comprising:

two flaps slidable with respect to one another, each of said two flaps including at least as many openings as first contacts in said connector outlet and similarly arranged as said plurality of first contacts and said two flaps, when said non-mobile and mobile connector elements are uncoupled, are positioned with respect to one another so that the said openings are mutually offset to cover said plurality of first contacts; and means for sliding said two flaps with respect to one another during coupling until said openings are juxtaposed so that said openings can be crossed by said contact pieces.

2. The electrical connector according to claim 1, wherein said two flaps comprise a base flap including a free edge, and an upper flap slidably mounted on said base flap; and said protective element is wedge-shaped including an open portion towards an outside opening of said connector outlet, and includes an incurved base connected to said base flap, and an axis of rotation arranged in the vicinity of said free edge of said base flap.

3. The electrical connector according to claim 2, wherein said incurved base and said base flap are of one piece construction.

4. The electrical connector according to claim 2, wherein said coupler socket includes an incurved portion having a shape conjugated to that of said incurved base of said protective element so that said coupler socket can be tightly housed in said protective element.

5. The electrical connector according to claim 1, wherein said protective element comprises at least one latching element, which in an initial coupling position, prevents any rotation of said protective element, and is unlatchable by said coupler socket during coupling.

6. The electrical connector according to claim 1, wherein said means for sliding of said two flaps with respect to one another are arranged so that sliding of said two flaps is at least undertaken during rotation of said coupler socket.

7. The electrical connector according to claim 6, wherein said means for sliding of said two flaps with respect to one another is capable of maintaining the position of said two flaps with respect to one another.

8. The electrical connector according to claim 7, wherein said means for sliding of said two flaps with respect to one another comprise at least one fixed cam arranged in said connector outlet and at least one driving finger fixed to said upper flap and capable of cooperating with said at least one fixed cam.

9. The electrical connector according to claim 6, further comprising means for maintaining the position of said two flaps with respect to one another.

10. The electrical connector according to claim 6, wherein said means for sliding of said two flaps with respect to one another comprise at least one fixed cam arranged in said connector outlet and at least one driving finger fixed to said upper flap and capable of cooperating with said at least one fixed cam.

11. The electrical connector according to claim 5, wherein said means for sliding of said two flaps with respect to one another comprise at least one fixed cam arranged in said connector outlet and at least one driving finger fixed to said upper flap and capable of cooperating with said at least one fixed cam, and said latching element, in an initial position of said protective element is latched by said driving finger abutting a portion of said fixed cam, and is unlatched by said coupler socket during coupling, which simultaneously slides said two flaps with respect to one another, and the sliding continues by the cooperation of said finger and said cam.

12. The electrical connector according to claim 11, wherein said coupler socket comprises a curved frontal portion capable of biasing said driving finger to cause the unlatching and sliding of said two flaps with respect to one another.

13. The electrical connector according to claim 1, wherein said protective element comprises a rotational axis and a plurality of housings arranged near said rotational axis, and said coupler socket comprises lateral lugs dimensioned to fit into said housings.

14. The electrical connector according to claim 1, wherein said protective element and said coupler socket comprise a geometric axis of rotation, said connector outlet comprises a window and said coupler socket comprises a means for hooking and latching capable of cooperating with said said window, said window arranged across from said geometric axis of rotation so as to ensure a latching of said coupler socket in said connector outlet when said coupler socket and said connector outlet are coupled.

15. The electrical connector according to claim 1, wherein said coupler socket comprises a notch and said protective element comprises at least one guiding lug capable of cooperating with said notch to position said coupler socket during coupling.

16. The electrical connector according to claim 1, wherein said coupler socket comprises:

a plurality of shafts each including an upper opening; and a translationally mounted protective flap including at least as many openings as second contacts in said coupler socket and similarly arranged as said plurality of second contacts, wherein said plurality of second contacts are arranged in said shafts, and said upper openings are masked, when uncoupled, by said translationally mounted protective flap; and said connector outlet comprises means for sliding said translationally mounted protective flap so as to juxtapose said openings of said translationally mounted protective flap with said second contacts of said coupler socket during coupling.

17. The electrical connector according to claim 16, wherein said translationally mounted protective flap comprises a rear portion, said means for sliding said translationally mounted protective flap comprise at least one fixed abutment arranged so as to bias said rear portion by pushing frontwardly during rotation of said coupler socket, and said two flaps of said protective element comprise corresponding openings for the passage of said abutment.

18. The electrical connector according to claim 16, wherein said coupler socket comprises at least one elastic element, retractable by biasing during coupling, and said translationally mounted protective flap is latched, when uncoupled, by said at least one elastic element.

19. The electrical connector according to claim 18, further comprising means for permitting the set-back of said elastic element.

20. The electrical connector according to claim 19, wherein said protective element comprises a guiding lug and said means for permitting the set-back of said elastic element comprises said guiding lug.

21. The electrical connector according to claim 1, wherein each of said connector outlet and said coupler socket comprise at least one pilot contact opposing each other for controlling a disconnection apparatus located upstream from one of said connector outlet and said coupler socket, wherein each of said pilot contact is arranged at a greater distance from said geometric axis of rotation of said coupler socket than said first and second contacts, so as to obtain, during coupling of said connector outlet and said coupler socket by rotation, the connection of said pilot contact of one element with said opposing pilot contact of said other element only after the connection of said power contacts, and to obtain, during uncoupling of said connector outlet and said coupler socket, the disconnection of said pilot contacts before the disconnection of said power contacts.

22. The electrical connector according to claim 1, wherein said outlet is arranged on an automotive vehicle and said coupler socket is connected to an electrical supply source.

23. The electrical connector according to claim 1, wherein at least one of said plurality of first contacts and second contacts comprises a pressure contact.

24. The electrical connector according to claim 1, wherein at least one of said plurality of first and second contacts comprise elastically mobile contact terminals fixed to connection cables arranged at a level of said terminals and perpendicular to said connection direction.

25. The electrical connector according to claim 1, wherein said protective element comprises at least one return spring to rotationally bias said protective element in the uncoupled position, and at least one return spring to translationally bias at least one of said flaps of said protective element toward the unoupled position.

26. An electrical connector outlet comprising:

a housing including a plurality of contacts extending parallel to one another and defining a connection direction; and a protective element covering said contacts, rotationally mounted in said housing so as to be capable of being rotationally driven, wherein said protective element comprises:

two flaps slidable with respect to one another, each of said two flaps including at least as many openings as contacts and similarly arranged as said plurality of contacts and said two flaps, when the connector outlet is uncoupled, are positioned with respect to one another so that the said openings are mutually offset to cover said plurality of contacts; and means for sliding said flaps with respect to one another during coupling until said openings are juxtaposed so that said openings can be crossed by said contacts.

27. An electrical coupler socket for being electrically joined to an electrical connector outlet, the coupler socket comprising:

a plurality of shafts each including an upper opening;

a plurality of contacts arranged in said plurality of shafts;

a translationally mounted protective flap including at least as many openings as contacts and similarly arranged as said plurality of contacts, so said upper openings are masked in a first position of said flap and are aligned with said openings in a second position of said flap; and a curved portion having a shape conjugated to that of an incurved base of a protective element rotationally mounted in said electrical connector outlet such that said coupler socket can be tightly housed in the protective element when the socket and outlet are electrically joined.

* * * * *